United States Patent
Zhang et al.

(10) Patent No.: US 10,962,076 B2
(45) Date of Patent: Mar. 30, 2021

(54) ACTIVE ROTARY INERTIA DRIVER SYSTEM

(71) Applicant: Qingdao University of Technology, Shandong (CN)

(72) Inventors: Chunwei Zhang, Shandong (CN); Hao Wang, Shandong (CN)

(73) Assignee: Qingdao University of Technology, Qingdao (CN)

( * ) Notice: Subject to any disclaimer, the term of this patent is extended or adjusted under 35 U.S.C. 154(b) by 0 days.

(21) Appl. No.: 16/985,179

(22) Filed: Aug. 4, 2020

(65) Prior Publication Data

US 2020/0362932 A1    Nov. 19, 2020

Related U.S. Application Data

(63) Continuation of application No. PCT/CN2019/105646, filed on Sep. 12, 2019.

(30) Foreign Application Priority Data

Feb. 1, 2019 (CN) .......................... 201910103396.5

(51) Int. Cl.
    *F16F 7/10* (2006.01)
(52) U.S. Cl.
    CPC .................................. *F16F 7/1005* (2013.01)
(58) Field of Classification Search
    CPC .. E04B 1/98; E04H 9/02; E04H 9/023; E04H 9/0215; F16F 15/167; F16F 15/36; F16F 15/173; F16F 15/18; F16F 15/22; F16F 15/30; F16F 15/31; F16F 7/1005; F16F 7/1017; F16F 15/005; F16F 15/0275
    See application file for complete search history.

(56) References Cited

U.S. PATENT DOCUMENTS

| | | | | |
|---|---|---|---|---|
| 5,964,327 A | * | 10/1999 | Shih | G05D 19/02 188/380 |
| 8,672,107 B2 | * | 3/2014 | Ivanco | F16F 9/12 188/380 |
| 2016/0032998 A1 | * | 2/2016 | Dhaens | F16F 7/1011 188/267 |
| 2018/0252287 A1 | * | 9/2018 | Mitsch | F16F 7/10 |
| 2020/0355237 A1 | * | 11/2020 | Zhang | F16F 15/0275 |

FOREIGN PATENT DOCUMENTS

| | | |
|---|---|---|
| CN | 102825613 A | 12/2012 |
| CN | 107022955 A | 8/2017 |
| CN | 209509216 U | 10/2019 |
| JP | 2000-88045 | * 3/2000 |

\* cited by examiner

*Primary Examiner* — Vishal R Sahni

(57) ABSTRACT

An active rotary inertia driver system includes an output support, a drive assembly and a rotary inertia plate. The output support includes a partition plate and a housing. The partition plate is fixed on an inner wall of the housing, and the housing is connected with a controlled structure. One end of the drive assembly is fixed on the housing and connected to one end of an output shaft. The other end of the drive assembly is fixed on the partition plate. The other end of the output shaft extends out of the housing and connected to the rotary inertia plate. The rotary inertia plate is a disc or a ring with a preset mass.

9 Claims, 4 Drawing Sheets

ACTIVE ROTARY INERTIA DRIVER SYSTEM

CROSS-REFERENCE TO RELATED APPLICATIONS

This application is a continuation of International Patent Application No. PCT/CN2019/105646, filed on Sep. 12, 2019, which claims the benefit of priority from Chinese Patent Application No. 201910103396.5, filed on Feb. 1, 2019. The content of the aforementioned applications, including any intervening amendments thereto, is incorporated herein by reference.

TECHNICAL FIELD

This application relates to vibration control, and more particularly to an active rotary inertia driver system.

BACKGROUND

Recently, with the development of economy and society, people's demands for living space have been improved continuously, so the infrastructure investment has been gradually increased. With the increase in the investment for civil engineering, more and more highways, railways, bridges, high-rise buildings and large-span spatial structures have been continuously built. Moreover, the exploration and development for spaces have gradually extended to deep sea and deep space, so that offshore platforms and space stations have received rapid development. During the construction and later operation, these space structures will inevitably suffer various loads, such as static loads and dynamic loads. During the operation, the dynamic loads, such as earthquake, wind, wave, stream, ice and explosion, generally show larger impact on the structure, and such dynamic loads will result in vibrations in the structure, which may give rise to fatigue and reliability problems, and even destruction of the structure, casualties and property losses. After exposed to the dynamic loads such as earthquake, the structure may suffer from serious destruction and fail to be used anymore, or even if the dynamic load does not cause the structure to collapse, the facilities, decorations and systems inside the structure may fail to be used anymore. Moreover, there may be a hidden danger of secondary disaster, posing great threat to human life and property safety.

Besides, with the advancement of techniques, the structure is expected to be not only usable, but also safe and durable, and further comfortable during the use. In the case that there are not any vibration isolation/reduction facilities in the high-rise structures, users will feel the swing of the structure under the impact of wind load, and when the wind is intense enough, the internal facilities will be destroyed due to the structural vibration, which has seriously threaten the life and property safety, let alone meet the requirement of comfortability.

To develop a system or method to eliminate or reduce the structural vibration caused by the external loads, extensive researches have been performed on the vibration control techniques and a great progress has been made. Currently, the vibration control is applied not only in the civil engineering, but also in the fields of aerospace, automobile, and mechanical, marine and military engineering. The vibration control devices can effectively reduce the dynamic response of civil engineering structures to relieve the destruction or fatigue of the structure, allowing for desirable safety, comfortability, economy and reliability. It has been demonstrated that the vibration control techniques are of important significance in the civil engineering, which can not only avoid or reduce the destruction of the structure, improve the hazard prevention performance of the structure and ensure the safety of lives and properties, but also extend the service life and reduce the maintenance cost of the structure, and maximumly satisfy the comfort requirements for the structure under extreme conditions.

The vibration control techniques for the civil engineering can be divided into four types: active control, passive control, semi-active control and hybrid control. Among them, the passive control has been relatively mature, in which a passive tuned vibration absorber generally includes a tuned mass damper (TMD) and a tune liquid damper (TLD), which have been used in many civil engineering structures. The tuned mass damper system is operated by adjusting the frequency of the substructure, i.e. the tuned mass damper and the tune liquid damper, to be the same as or close to the main structure, i.e. controlled structure, to allow the substructure to resonate with the main structure, so that the vibration energy in the main structure is dissipated by the inner damping mechanism of the substructure to reduce the dynamic response of the main structure, achieving the vibration control. The passive control TMD system has been applied in many high-rise buildings, such as the 60-story John Hancock Tower (Boston, US), the Petronas Towers (Kuala, Malaysia) and the 101 building (Taipei, China), and these practical applications indicate that the passive control TMD system has a stable and good controlling effect.

The movement of the structure is complicated and diverse, and is generally a combination of translation and torsion oscillation. When using the TMD system to control the vibration of a suspended structure, if the hanging direction is parallel to the swing vibration direction of the structure, the TMD system is capable of providing an effective control under the excitation input of whether the initial offset or the harmonic load; if the hanging direction is perpendicular to the swing vibration direction of the structure, no matter how to adjust the parameters (such as the pendulum length of the structure and the position of the control system), the TMD system always fails to work. Based on plenty of theoretical analysis and experiments, it can be concluded that the translatory TMD system is only effective to the translation movement of the structure and fails to control the swing vibration, where the reason is that the passive control systems such as the TDM system and the TLD system are in a centrifugal state at this time and lose their function, the mass block of the system (or the water in the tank of the TLD system) is static, and even the active control force of an active mass damper/driver (AMD) system needs to overcome the gravity component of the mass block, which leads to great reduction in the control efficiency. However, the swing vibration of the structure is very common, such as the swing of the suspended structure; the torsional swing vibration of the irregular building under the wind load; the torsional swing vibration of the offshore platform under a combined effect of wave, wind and ice. Therefore, it is required to design a special control system for the structural vibration/movement, which can overcome or get rid of the constraint of gravitational field (i.e. the centrifugal force) or allow the work/movement law to be decoupled with the gravitational field to promote the control system to move sufficiently to effectively control the structural vibration/movement.

In conclusion, the control device/system for structural vibration is currently indispensable in the civil engineering and is of important significance for the protection of users' life and property safety. However, the existing vibration control device/system generally has the following defects: (1) the translatory TMD system is only effective to the translation movement of the structure and fails to control the swing vibration; (2) the translatory AMD system is capable of controlling the swing vibration but the control efficiency is too low to satisfy the requirements; (3) the tuned mass damper and the tune liquid damper can effectively control the swing vibration, but a complicated frequency adjustment is required for the structure, so that they generally have defects of low control efficiency, poor effect, low robustness, low controllability and narrow application range when used for the control of some complicated structures.

SUMMARY

An object of the disclosure is to provide an active rotary inertia driver system to overcome the defects in the prior art that the translatory TMD system fails to control the swing vibration of the structure; the translatory AMD system has low control efficiency and poor effect; and the tuned mass damper and the tune liquid damper have low robustness, complicated frequency adjustment and narrow application range.

To achieve the above-mentioned object, the disclosure adopts the following technical solutions.

The disclosure provides an active rotary inertia driver system, comprising:
  an output support;
  a drive assembly; and
  a rotary inertia plate;
  wherein the output support comprises a partition plate and a housing; the partition plate is fixed on an inner wall of the housing; and the housing is connected to a controlled structure;
  a first end of the drive assembly is fixed on the housing and is connected to one end of an output shaft; a second end of the drive assembly is fixed on the partition plate; the other end of the output shaft extends out of the housing and is connected to the rotary inertia plate; and
  the rotary inertia plate is a disc or a ring with a preset mass.

In some embodiments, the drive assembly comprises a drive, a transmission and an encoder which are coaxially connected; an output end of the driver is connected to one end of the transmission; the other end of the transmission is connected to the output shaft; and the drive has the same outline as the transmission.

In some embodiments, the drive is a stepper motor or a servo motor.

In some embodiments, the drive assembly is fixed on the partition plate through a first flange bracket, and is fixed on the housing through a second flange bracket.

In some embodiments, the output shaft is connected to the rotary inertia plate through a flange plate.

In some embodiments, the rotary inertia plate is parallel to a rotation plane of the controlled structure; the drive assembly is connected to the rotary inertia plate through the output shaft and is perpendicular to the rotary inertia plate.

In some embodiments, the controlled structure is provided with a sensor for acquiring status data of the controlled structure.

In some embodiments, the transmission is a speed reducer.

In some embodiments, the active rotary inertia driver system further comprising:
  a controller;
  a wireless data transmission device; and
  a data acquisition device;
  wherein the wireless data transmission device and the data acquisition device are both arranged on a surface of the partition plate; the controller and the driver are electrically connected; the data acquisition device is configured to acquire a signal of the encoder and send the signal to an external control center via the wireless data transmission device; and the controller is configured to receive a control signal from the external control center via the wireless data transmission device and send the control signal to the driver; and the driver is capable of controlling a driving direction and a rotating speed of the rotary inertia plate according to the control signal.

Compared to the prior art, the disclosure has the following beneficial effects.

The active rotary inertia driver system provided herein adopts an active control technique instead of the conventional passive control to control the structural vibration, which can actively control the rotation state of the rotary inertia plate according to the real-time status of the controlled structure to achieve different control effects by adjusting the output torque applied to the controlled structure.

The active rotary inertia driver system provided herein introduces a drive assembly to output the control force, in which the complicated frequency modulation is not required, overcoming the defect that the control cannot be realized because of the technical restriction in the frequency modulation and allowing for a wider range of application.

The active rotary inertia driver system has a larger robustness, so that the control effect is not prone to the effect of structure shape and external load.

Figure 1:
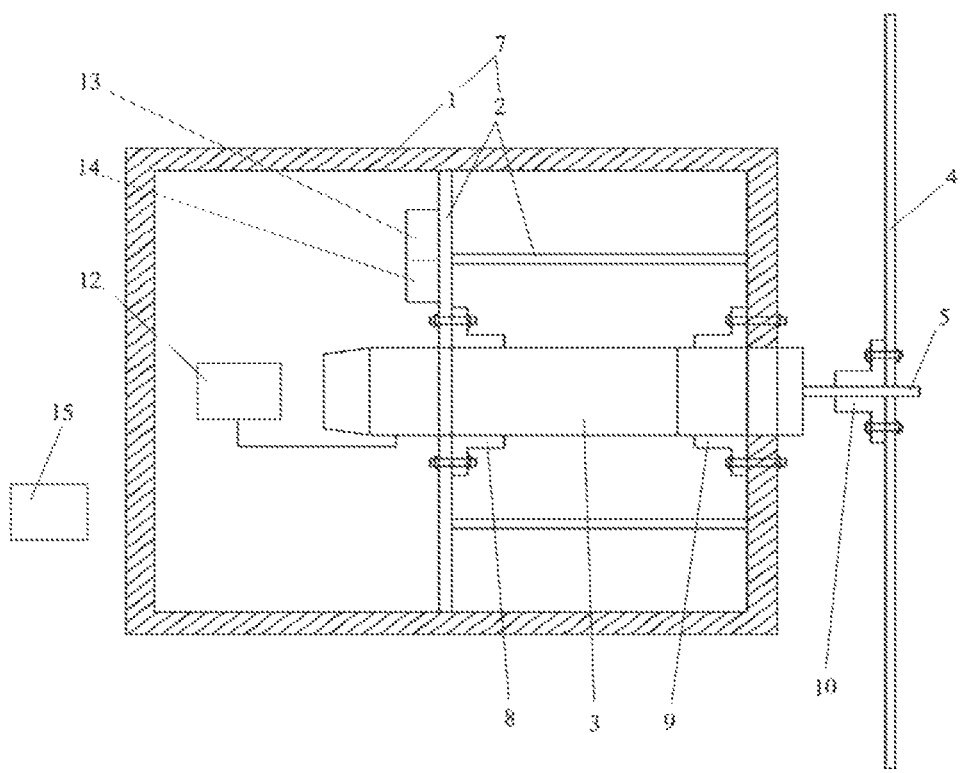
FIG. 1 is a schematic diagram of an active rotary inertia driver system according to this disclosure.

In the drawings: 1—housing; 2—partition plate; 3—drive assembly; 31—encoder; 32—drive; 33—transmission; 4—rotary inertia plate; 5—output shaft; 6—controlled structure; 7—output support; 8—first flange bracket; 9—second flange bracket; 10—flange plate; 11—sensor; 12—controller; 13—wireless data transmission device; 14—data acquisition device; 15—external control center.

DETAILED DESCRIPTION OF EMBODIMENTS

This disclosure will be further described with reference to the accompanying drawings.

Embodiment 1

In this embodiment, an active rotary inertia driver system is used in a single pendulum for exemplary description.

As shown in FIGS. 1-5, the active rotary inertia driver system includes an output support 7, a drive assembly 3 and a rotary inertia plate 4.

The output support 7 includes a partition plate 2 and a housing 1, where the partition plate 2 is fixed on an inner wall of the housing 1, and the housing 1 is connected with a controlled structure 6. The controlled structure 6 is provided with a sensor 11 for acquiring status data of the controlled structure 6, such as the swing angle of the swing vibration and the acceleration of the swing angle, where the sensor 11 is a photoelectric rotary encoder, an angular acceleration sensor or a gyroscope.

The single pendulum is used as the basic mechanical model, and a photoelectric rotary encoder is used as the sensor 11 to acquire status data of the controlled structure 6, such as the swing angle of the single pendulum and the acceleration of the swing angle, where the photoelectric rotary encoder is arranged at a lifting point of the controlled structure 6.

A first end of the drive assembly 3 is fixed on the housing 1 and connected to one end of an output shaft 5. A second end of the drive assembly 3 is fixed on the partition plate 2. The other end of the output shaft 5 extends out of the housing 1 and is connected to the rotary inertia plate 4. The drive assembly 3 includes a drive 32, a transmission 33 and an encoder 31 which are coaxially connected. The drive 32 requires an output of force instead of an output of high rotation speed. Therefore, in some embodiments, a speed reducer can be used as the transmission 33 to reduce the rotation speed of the drive 32 to satisfy the output of force. An output end of the drive 32 is connected to one end of the transmission 33; the other end of the transmission 33 is connected to the output shaft 5; and the drive 32 has the same outline as the transmission 33.

The drive 32 is a stepper motor or a servo motor. The drive assembly 3 is fixed on the partition plate 2 through a first flange bracket 8, and is fixed on the housing 1 through a second flange bracket 9. The output shaft 5 is connected to the rotary inertia plate 4 through a flange plate 10.

The rotary inertia plate 4 is a disc or a ring with a preset mass, and is generally made of metal or other materials with a high density. The rotary inertia plate 4 is parallel to a rotation plane of the controlled structure 6; the drive assembly 3 is connected to the rotary inertia plate 4 through the output shaft 5, and is perpendicular to the rotary inertia plate.

Figure 2:
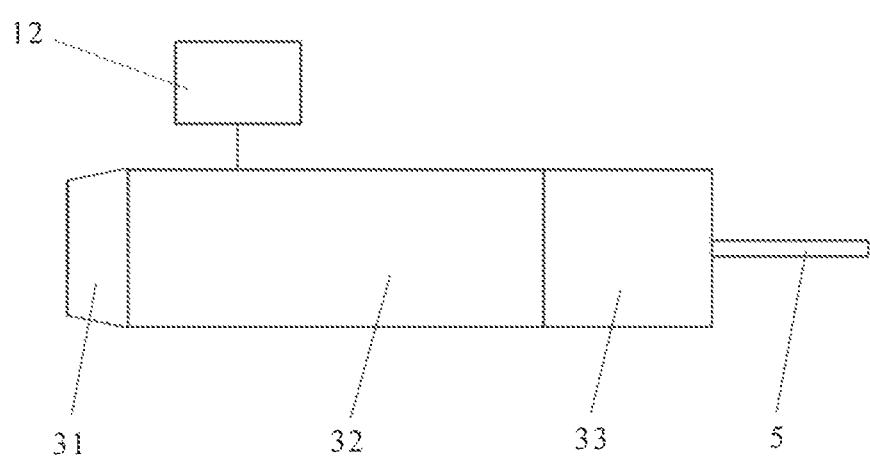
FIG. 2 is a schematic diagram of a drive assembly of the active rotary inertia driver system according to this disclosure.
Figure 3:
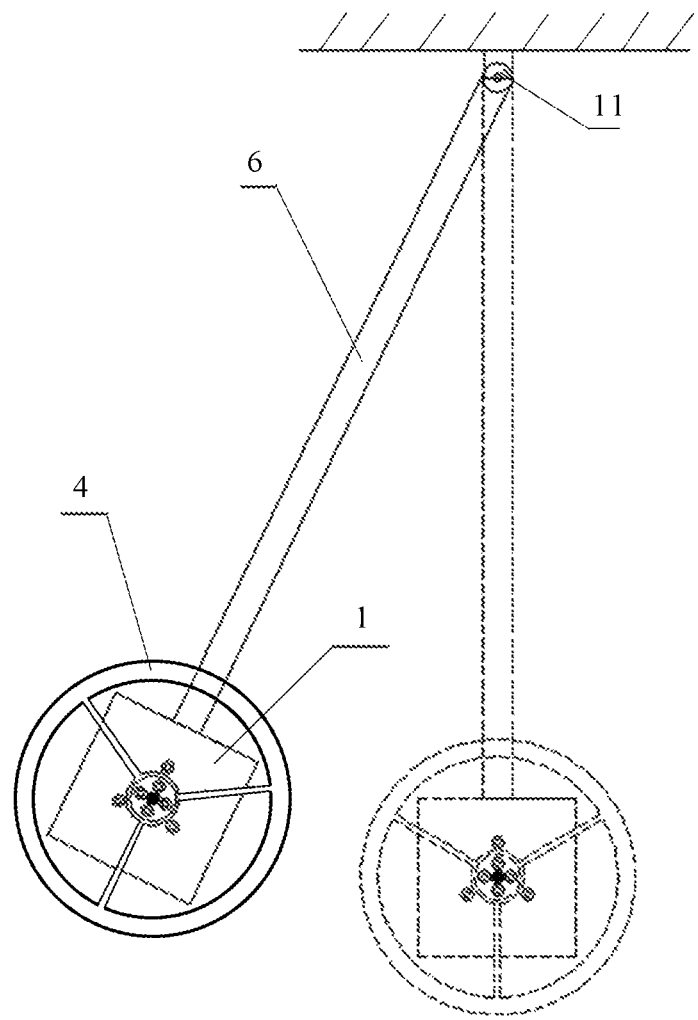
FIG. 3 is a front view of the active rotary inertia driver system in a single pendulum model according to this disclosure.
Figure 4:
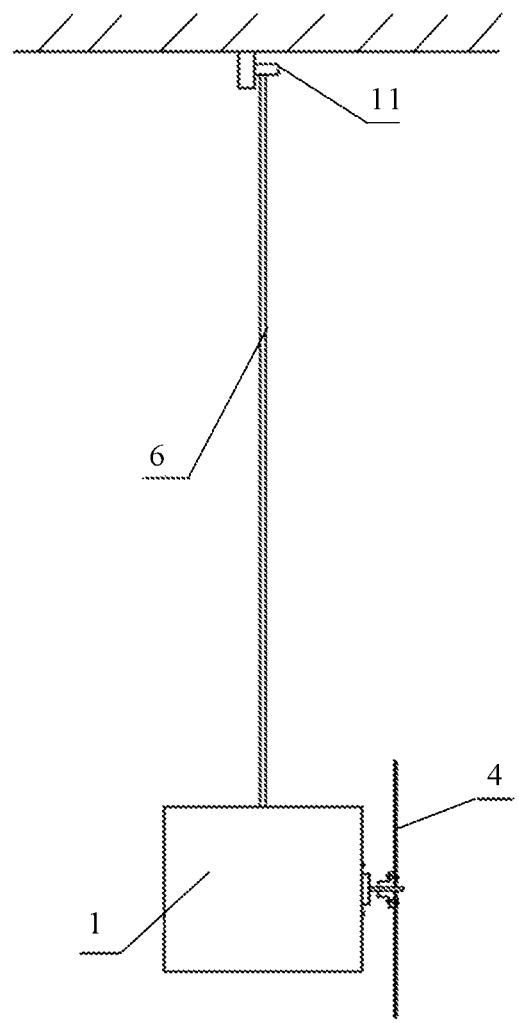
FIG. 4 is a side view of the active rotary inertia driver system in the single pendulum model according to this disclosure.
Figure 5:
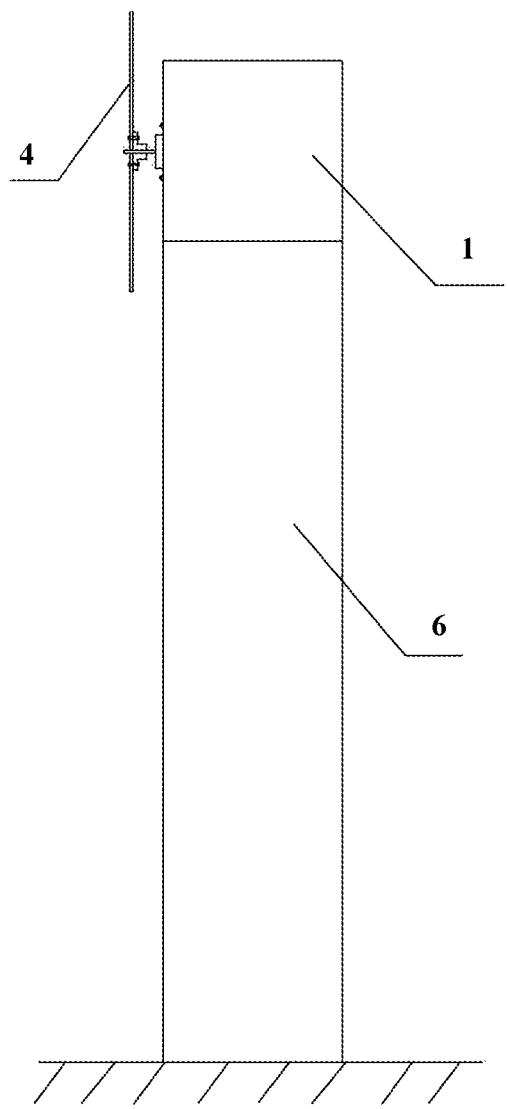
FIG. 5 schematically shows the active rotary inertia driver system in an inverted pendulum according to this disclosure.

As shown in FIGS. 1 and 2, the active rotary inertia drive control system further includes a controller 12, a wireless data transmission device 13 and a data acquisition device 14. The wireless data transmission device 13 and the data acquisition device 14 are both arranged on a surface of the partition plate 2. The controller 12 and the drive 32 are electrically connected; the data acquisition device 14 is configured to acquire a signal of the encoder 31 and send the signal to an external control center 15 via the wireless data transmission device 13; and the controller 12 is configured to receive a control signal from the external control center 15 via the wireless data transmission device 13 and send the control signal to the drive 32, and the drive 32 is capable of controlling a driving direction and a rotating speed of the rotary inertia plate 4 according to the control signal. The wireless data transmission device 13 can adopt a conventional wireless device such as Bluetooth and Wi-Fi. The control and transmission technique is known in the art, which merely involves simple transmission and process of signals, and thus it is not further described in detail herein.

An acting force of the active rotary inertia driver system is generated through the rotation of the rotary inertia plate 4 driven by the drive assembly 3. Most of the acting force is transited to the housing 1 through the partition plate 2 and then applied on the controlled structure 6. Since the drive assembly 3 is directly connected to the housing 1, a part of the acting force is transited to the housing through the drive assembly 3, and further applied on the controlled structure 6.

The active rotary inertia driver system can also be connected to an inverted pendulum to control its swing vibration.

The active rotary inertia driver system is used according to the following steps.

The sensor 11 acquires the status data, including the swing angle and the acceleration of the swing angle, of the swing vibration of the controlled structure 6, and sends the status data to the external control center 15 through the wireless data transmission device 13. When the controlled structure 6 begins to swing back and the status data of the swing vibration of the controlled structure 6 exceeds a preset threshold, the external control center 15 generates an external control signal and transits the external control signal to the controller 12 through the wireless data transmission device 13. The controller 12 controls the drive 32 to operate according to the external control signal, further driving the entire drive assembly 3 to work. The drive 32 can control the rotary inertia plate 4 to swing back according to the status data of the swing vibration which is measured by the sensor 11 in real time. A counter acting force is generated via the rotation of the rotary inertia plate 4 and applied on the housing 1, and then transited to the controlled structure 6 connected with the housing 1 to restrain the swinging of the controlled structure 6. The encoder 31 is coaxially arranged at one end of the drive 32 away from the transmission 33 to acquire the rotation information of the drive 32 in real time and transit the rotation information to the data acquisition device 14 for data processing. After that, the processed data is transited to the external control center 15 through the wireless data transmission device 13, and the external control center 15 generates a corresponding external control signal according to the processed data and transmits the external control signal to the controller 12 through the wireless data transmission device 13. A closed-loop control device consisting of the external control center 15, the controller 12, the controlled structure 6 and the driver 32 is thus formed. According to the swing amplitude and frequency of the controlled structure 6 acquired in real time, the rotation of the rotary inertia plate 4 controlled by the drive 32 can be adjusted in real time to adjust the output torque applied to the controlled structure 6, adjusting the driving power output of the active rotary inertia driver system to achieving a high-efficiency control for the vibration of the controlled structure 6.

The invention is designed based on the basic conception of mechanics that the force and couple are not equivalent to each other. Sometimes, the movement features of the controlled object determine that the rotation type is required to be controlled by the torque, thus the conventional control devices characterized by force output or linear movement all fail to achieve the desirable control. The active control device provided herein is suitable for the control of rotation, torsion or swing vibration of structures or systems.

The application of the active rotary inertia driver system provided herein is not limited to: the control of the swing vibration of the suspended structure under gravity; the control of the fluttering and buffeting vibration of large-span suspension bridges under the wind load; the control of the vibration of civil engineering structures caused by wind and earthquake; the control of the pitching movement of vehicles under the excitation of an uneven road; the control of the rolling, pitching and yawing of ships or offshore platforms under a combined excitation of wind, wave and current; and the control of the fixed-axis rotation of rigid bodies around space axis.

Described above are only preferred embodiments of the present disclosure, and are not intended to limit the present disclosure. Any modifications, replacements and improvements made by those skilled in the art without departing from the spirit of the present disclosure shall fall within the scope of the present disclosure.

What is claimed is:

1. An active rotary inertia driver system, comprising:
an output support;
a drive assembly; and
a rotary inertia plate;
wherein the output support comprises a partition plate and a housing; the partition plate is fixed on an inner wall of the housing; and the housing is connected to a controlled structure;
a first end of the drive assembly is fixed on the housing and is connected to one end of an output shaft; a second end of the drive assembly is fixed on the partition plate; the other end of the output shaft extends out of the housing and is connected to a center of the rotary inertia plate; and
the rotary inertia plate is a disc or a ring with a preset mass.

2. The active rotary inertia driver system of claim 1, wherein the drive assembly comprises a drive, a transmission and an encoder which are coaxially connected; an output end of the drive is connected to one end of the transmission; the other end of the transmission is connected to the output shaft; and the drive has the same outline as the transmission.

3. The active rotary inertia driver system of claim 2, wherein the drive is a stepper motor or a servo motor.

4. The active rotary inertia driver system of claim 1, wherein the drive assembly is fixed on the partition plate through a first flange bracket, and is fixed on the housing through a second flange bracket.

5. The active rotary inertia driver system of claim 1, wherein the output shaft is connected to the rotary inertia plate through a flange plate.

6. The active rotary inertia driver system of claim 1, wherein the rotary inertia plate is parallel to a rotation plane of the controlled structure; and the drive assembly is connected to the rotary inertia plate through the output shaft and is perpendicular to the rotary inertia plate.

7. The active rotary inertia driver system of claim 2, wherein the controlled structure is provided with a sensor for acquiring status data of the controlled structure.

8. The active rotary inertia driver system of claim 2, wherein the transmission is a speed reducer.

9. The active rotary inertia driver system of claim 7, further comprising:
a controller;
a wireless data transmission device; and
a data acquisition device;
wherein the wireless data transmission device and the data acquisition device are both arranged on a surface of the partition plate; the controller and the drive are electrically connected; the data acquisition device is configured to acquire a signal from the encoder and send the signal to an external control center via the wireless data transmission device; and the controller is configured to receive a control signal from the external control center via the wireless data transmission device and send the control signal to the drive, so as to control a direction in which the rotary inertia plate is driven and a rotating speed of the rotary inertia plate according to the control signal.

* * * * *